Feb. 20, 1934. F. G. ALBORN 1,947,820
TIRE CARRIER
Filed Dec. 23, 1929 2 Sheets-Sheet 1
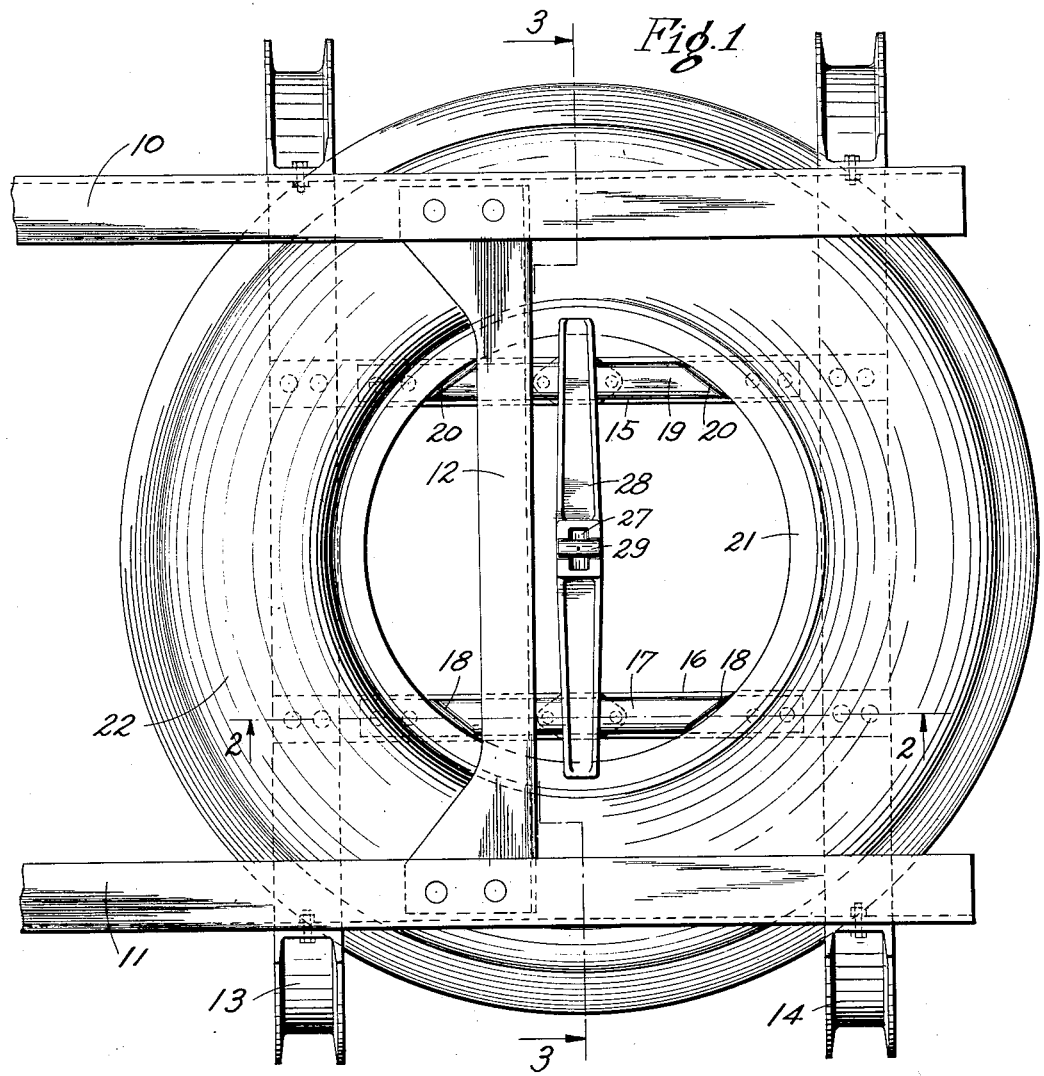
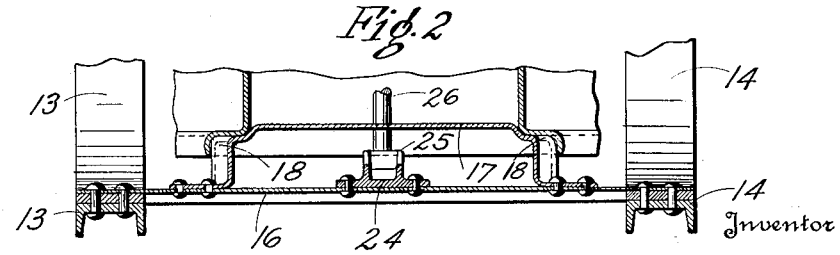
Inventor
FRANK G. ALBORN
BY Richey & Watts
Attorneys Feb. 20, 1934.  F. G. ALBORN  1,947,820
TIRE CARRIER
Filed Dec. 23, 1929    2 Sheets-Sheet 2
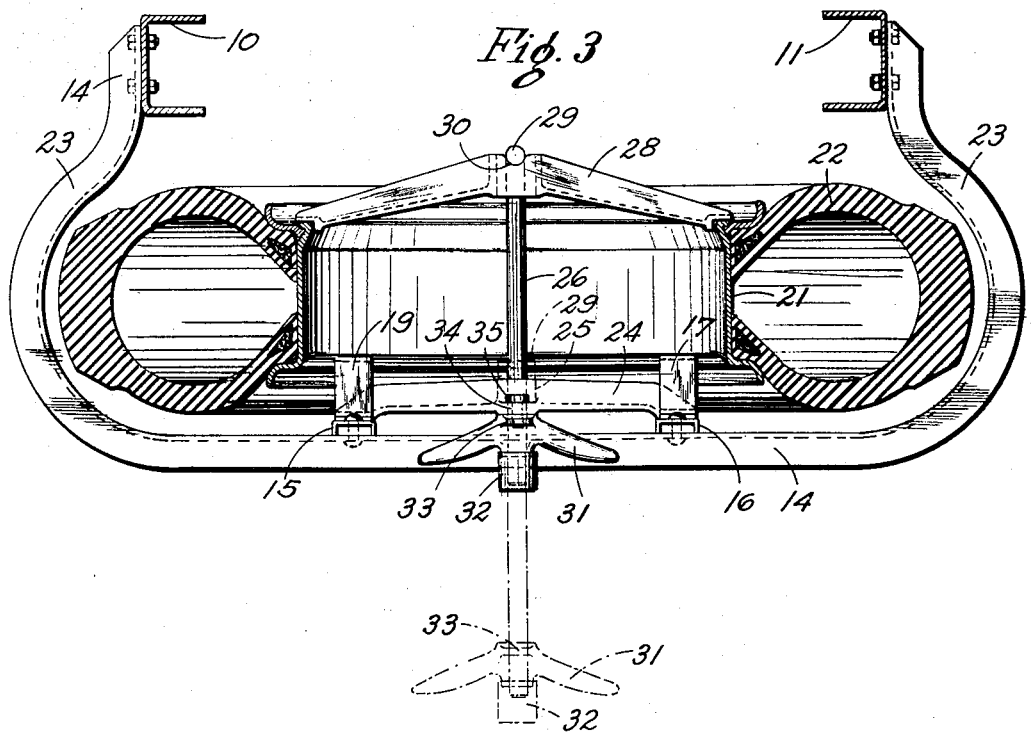
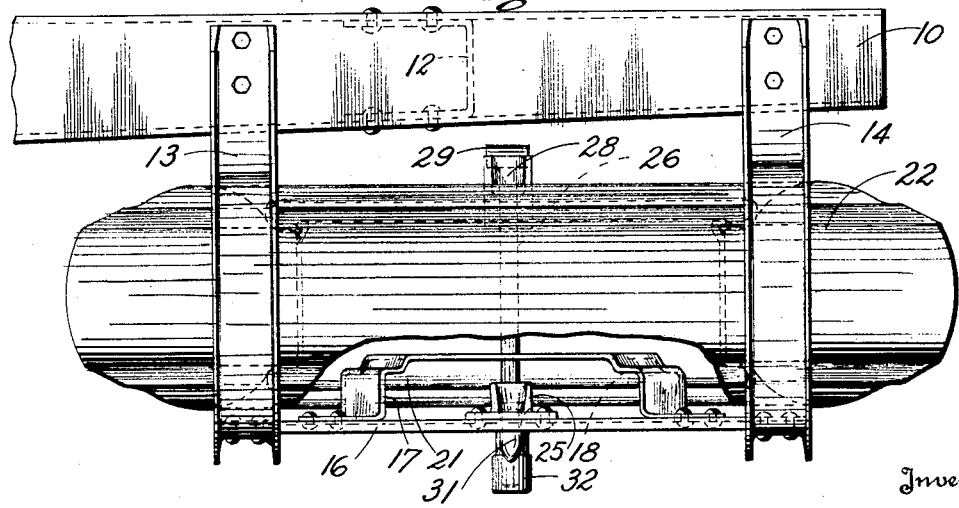
Inventor
FRANK G. ALBORN
By Richey & Watts
Attorneys Patented Feb. 20, 1934

1,947,820

UNITED STATES PATENT OFFICE 1,947,820

TIRE CARRIER

Frank G. Alborn, Cleveland, Ohio, assignor to The White Motor Company, Cleveland, Ohio, a corporation of Ohio Application December 23, 1929. Serial No. 415,898

8 Claims. (Cl. 224—29)

This invention relates to tire carrier, and more particularly to underslung tire carriers for trucks and busses.

One object of this invention is to provide an improved structure for carrying a spare tire and rim beneath the chassis frame of a vehicle.

Another object is to arrange the supporting members in such a manner that the tire will be supported by the rim out of contact with any elements, which might tend to chafe the tire.

A further object is to construct the rim engaging members in such a manner that they will serve as tracks on which the tire may be slid into position, and will also serve as means to center the tire properly preparatory to clamping the same in position.

Another object is to provide an improved clamping means for securing a tire on the support.

Other objects relating to details of construction and economies of manufacture will become apparent upon a more complete examination of this specification.

In the accompanying drawings:

Figure 1 is a plan view of the rear end of a chassis frame with the improved tire carrier mounted thereon;

Figure 2 is a section taken on the line 2—2 of Figure 1; showing portions of a rim with the tire removed;

Figure 3 is a section taken on the line 3—3 of Figure 1; and

Figure 4 is a side elevation of the device, a portion of the tire being broken away.

Referring to the drawings, the numerals 10 and 11 designate the opposite side rails of a vehicle chassis frame. A cross member 12 connects the side rails near the rear ends thereof. A pair of U-shaped hangers 13 and 14 have their opposite ends secured to the opposite side rails and extend across below the frame. Longitudinal channel bars 15 and 16 have their ends connected to the hangers 13 and 14 and extend substantially parallel to the frame side rails.

A supporting member 17 bent from a sheet metal strip is secured to the longitudinal bar 16 and extends parallel therewith. Adjacent each end, the member 17 is bent downwardly to form diagonal shoulders 18. A similar supporting member 19 having diagonal shoulders 20 is secured to the longitudinal bar 15. The angularity and spacing of the shoulders 18 and 20 is such that they fit closely within the inner periphery of the rim 21 and support the same at four spaced points, as shown in Figure 1. It is evident that the supports 17 and 19 are identical and may be formed from the same dies.

The shoulders 18 and 20 are spaced above the longitudinal bars 15 and 16 a sufficient distance to maintain the tire 22 out of contact therewith. The vertical portions of the hanger are of sufficient length to allow clearance below the frame for positioning the tire, and are bowed outwardly, as indicated at 23, to clear the outer periphery of the tread.

A transverse member 24 has its ends secured to the longitudinal channel bars 15 and 16 substantially midway between the hangers 13 and 14. An apertured boss 25 is formed centrally on the member 24 to receive a clamping rod 26. The upper end of the rod 26 passes through a rectangular aperture 27 in a clamping bar 28 and is provided with a T head 29. When the rod 26 is turned so that the T head 29 is parallel with the bar 28, the head passes freely through the aperture 27. When the rod 26 is turned through 90 degrees from this position, the head engages the side walls of the aperture and holds the bar 28 against the tire rim 21. Recesses 30 are formed in the side walls of the aperture to prevent accidental displacement of the head 29.

The opposite ends of the bar 28 are arranged to engage the upper side of the rim at diametrically opposed points to clamp the same in position on the diagonal shoulders 18 and 20. In order to secure a clamping action, a wing nut 31 is threaded on the lower end of the rod 26 and abuts the underside of the transverse member 24. When the head 29 is disposed in the recesses 30 and the nut 31 tightened, the rim is firmly clamped in position.

The tapped opening in the nut 31 extends entirely therethrough, and is closed on the enter side by a sheet metal cap 32 which is spun or otherwise suitably secured on the nut. This cap protects the threads on the rod 26 from mud, and also serves as a convenient container for grease, to insure ease of manipulation of the nut.

The nut and the transverse member 24 are provided with apertured ears 33 and 34, respectively, to receive a stud 35 or the shackle of a padlock in the conventional manner.

When it is desired to remove a tire from the carrier, the nut 31 is loosened, the rod 26 is turned to allow the head 29 to pass through the aperture 27, and the rod is then dropped to the position shown in dotted lines in Figure 3, with the head 29 resting upon the upper side of the transverse member 24. Pressing downwardly upon the rear end of the tire causes the same to tilt and clear the forward shoulders 18 and 20. The tire and rim can then be pulled rearwardly from the carrier, the supports 17 and 19 acting as rails or tracks to facilitate this movement.

To replace a tire on the carrier, the same may be rolled on the ground to a point behind the vehicle and allowed to fall forwardly until it rests upon the hanger 14. The lower portion of the tire can then be grasped and raised and then pushed inwardly over the supports 17 and 19. When it has reached the proper position the rim drops down upon the four diagonal shoulders. The clamping bar 28 can then be replaced and drawn down by means of the nut 31.

It will be evident that the sheet metal supports 17 and 19 possess sufficient resilience to overcome slight inaccuracies in the manufacture or assembly of the parts. At the same time, the supports are not subject to excessive vibration, since bending of a support at one shoulder is resisted by the opposite angularity of the other.

Although the foregoing description is necessarily of a detailed character in order that the invention may be completely set forth, it is to be understood that the specific terminology is not to be construed as restrictive or confining, and that various modifications and re-arrangements of parts can be made without departing from the scope of the invention as defined in the following claims.

What I claim is:

1. In a tire carrier, a supporting bar, means for mounting the same on a vehicle, a strip carried by said bar and having a main portion thereof substantially parallel to said bar portions of said strip being bent along oppositely inclined diagonal lines to form rim engaging shoulders.

2. An underslung tire carrier comprising a pair of hangers, bars connecting said hangers, a strip carried by each bar and having a main portion thereof substantially parallel to said bar, portions of each strip being bent along oppositely inclined diagonal lines to form rim engaging shoulders.

3. In a tire carrier, a supporting bar, means for mounting the same on a vehicle, a resilient sheet metal strip secured to said bar and having a main portion thereof substantially parallel to said bar, portions of said strip being bent along oppositely inclined diagonal lines to form rim engaging shoulders spaced from said bar.

4. In a tire carrier, a pair of spaced hangers arranged to be suspended from the frame side rails of a vehicle, and means for supporting a tire and rim within and spaced from said hangers including a pair of flat resilient metal strips carried by and extending between said hangers, said strips being spaced apart and each of said strips being formed with a pair of raised rim engaging shoulders by being bent downwardly, outwardly and then downwardly on lines extending diagonally across the length of the strip, the lines of bend for forming the two shoulders on each strip being oppositely inclined across the strip.

5. A tire carrier comprising a pair of hangers fixedly secured at their ends to the frame side rails of the vehicle, a pair of spaced rigid bars having their opposite ends secured to said hangers and a rim engaging member mounted on each of said bars and comprising a flat sheet metal strip having its opposite ends secured to the bar and being bent upward adjacent its ends on oppositely inclined lines and then bent into a plane parallel to the bar on similarly inclined lines to form a pair of rim engaging shoulders spaced from each other and above the plane of the bar and supported from the bar solely by the oppositely inclined upwardly extending portions of the strip.

6. A tire carrier comprising a pair of rigid hanger members fixedly secured to the frame side rails of a vehicle, a pair of rigid bars having their opposite ends secured to said hangers, a rigid transverse member having its opposite ends secured to the central portions of said bars and a pair of relatively resilient rim supporting members each having its opposite ends secured to one of said bars and extending parallel therewith, the intermediate portion of each member being raised above the plane of the bars to form a pair of rim engaging shoulders at the end of the raised portion and said intermediate portion extending along parallel with the bar and spaced over the connection between the bar and the one end of said transverse member.

7. A tire carrier comprising a pair of relatively rigid hanger members having their opposite ends secured to the frame side rails of a vehicle and having their intermediate portions extending across substantially horizontally under the frame rails, a pair of spaced bars having their ends secured to the horizontal portions of said hangers, a transverse member having its central portion raised above the plane of said bars and having its opposite ends extending downwardly and secured to the central portions of said bars, a pair of rim engaging members each having its intermediate portion disposed horizontally and arranged above the plane of said bars and said transverse member and extending parallel with one of said bars and having its ends bent down and secured to said bar and means for securing the rim against said rim engaging members including a rod extending upwardly through the central portion of said transverse member and having a rim engaging clamp at its upper end and screw means at its lower end for engaging against the under side of said transverse member.

8. In an underslung tire carrier comprising a pair of spaced rigid hangers each having its opposite ends upturned and connected to opposite side rail members of a vehicle frame, a pair of substantially rigid bars each having one end secured to an intermediate portion of one of said hangers, said bars and said hangers being fastened together to form a substantially rigid unit relative to said frame and a pair of relatively resilient metal strips, each having its ends secured to one of said bars and its intermediate portion spaced above the bar, the spaced portions of said strips forming relatively resilient rim engaging shoulders for engaging a rim with a tire thereon and supporting the tire and rim out of contact with the hangers and bars.

FRANK G. ALBORN.